United States Patent [19]

Vorlop et al.

[11] Patent Number: 5,015,448

[45] Date of Patent: May 14, 1991

[54] PARTICULATE MATERIAL SUITABLE FOR SELECTIVELY SEPARATING METAL CATIONS FROM AQUEOUS SOLUTIONS, PROCESS FOR ITS PRODUCTION, AND USE THEREOF

[75] Inventors: Klaus-Dieter Vorlop, Braunschweig; Michael Sell, Peine, both of Fed. Rep. of Germany

[73] Assignee: GUTEC Gesellschaft zur Entwicklung von Umweltschutztechnologie mbH, Hannover, Fed. Rep. of Germany

[21] Appl. No.: 262,836

[22] Filed: Oct. 26, 1988

[30] Foreign Application Priority Data

Oct. 28, 1987 [DE] Fed. Rep. of Germany ....... 3736437

[51] Int. Cl.$^5$ ............................................. B01D 15/00
[52] U.S. Cl. ...................................................... 423/24
[58] Field of Search ............................................ 423/24

[56] References Cited

U.S. PATENT DOCUMENTS

| 3,645,922 | 2/1972 | Weiss | 260/2.1 R |
| 3,953,360 | 4/1976 | Morishita et al. | 252/428 |
| 4,118,336 | 10/1978 | Morishita et al. | 252/316 |
| 4,324,767 | 4/1982 | Dines | 423/3 |
| 4,414,111 | 11/1983 | Iwaisako et al. | 210/500.2 |
| 4,500,494 | 2/1985 | Scher | 423/24 |

FOREIGN PATENT DOCUMENTS 66630 12/1982 European Pat. Off. .
980185 1/1965 United Kingdom .

OTHER PUBLICATIONS

Cox, "Modern Extractants for Copper, Cobalt and Nickel", *Chemistry and Industry*, pp. 188–193 (1987).
Fiedler, *Lexikon der Hilfsstoffe fuer Pharmazie, Kosmetik und Angrenzende Gebiete*, pp. 265–270 (1971).

*Primary Examiner*—Peter D. Rosenberg
*Attorney, Agent, or Firm*—Foley & Lardner, Schwartz, Jeffery, Schwaab, Mack, Blumenthal & Evans

[57] ABSTRACT

The invention relates to particulate material for separation of metal cations from aqueous solutions. These particles contain complexing agents dispersed in a continuous aqueous phase which is embedded in or is a constituent of a hydrophilic gel and/or is encapsulated by a water-insoluble, ion-permeable shell.

26 Claims, No Drawings

PARTICULATE MATERIAL SUITABLE FOR SELECTIVELY SEPARATING METAL CATIONS FROM AQUEOUS SOLUTIONS, PROCESS FOR ITS PRODUCTION, AND USE THEREOF

BACKGROUND OF THE INVENTION

This invention relates to a particulate material suitable for selectively removing metal cations from aqueous solutions. The invention further relates to a process for producing the material of the invention and to the use of the material of the invention.

Materials for removing ionic components from aqueous solutions are known. Thus, ion exchange resins are utilized for removing ions from aqueous solutions. Low selectivity, decreasing activity and leaching out of the resin into the aqueous solution are undesired side effects when these resins are used.

In U.S. Pat. No. 4,500,494, a material for removing metal cations from water is disclosed which contains a water-insoluble chelate former, which is either liquid or is dissolved in a water-insoluble solvent, in microcapsules which have a shell of polyurea or urea-formaldehyde. A disadvantage of this material is based on the fact that the solvent in the microcapsules comprises optionally chlorinated aromatic or chlorinated aliphatic hydrocarbons. Continuous diffusion of the solvent through the polymer shell is unavoidable.

SUMMARY OF THE INVENTION

It is the object of the invention to overcome the disadvantages of the known materials and to develop a separating material with improved selectivity and effectiveness.

This and other objects of the invention are achieved by providing a particulate material suitable for selective separation of metal cations from aqueous solutions, wherein said material comprises a non-ionic, non-polymeric complexing agent, which complexes with the metal cations, dispersed in a continuous aqueous phase, and wherein said aqueous phase is embedded in a hydrophilic gel or is a component of a hydrophilic gel or is encapsulated by a water-insoluble, ion-permeable shell.

The objects of the invention are also achieved by providing a process for producing a particulate material which is suitable for selectively separating metal cations from aqueous solutions and which contains a non-ionic, non-polymeric agent, which complexes with the metal cations, dispersed in a continuous aqueous phase which is embedded in a hydrophilic gel or is a component of a hydrophilic gel or is surrounded by a water-insoluble, ion-permeable shell, said process comprising the steps of: (a) dispersing said complexing agent in an aqueous phase which contains a cross-linking agent, a precursor of a hydrophilic gel cross-linkable by a cross-linking agent or a thermally cross-linkable precursor of a hydrophilic gel; and (b) forming particles from the dispersion obtained in step (a) by a step (b) selected from the group consisting of (b1) introducing a dispersion obtained in step (a) containing a cross-linking agent into a solution which contains a gel precursor of a water-insoluble, ion-permeable shell material cross-linkable by the said cross-linking agent in order to encapsulate the dispersion with a substantially water-insoluble, ion-permeable shell; (b2) introducing a dispersion obtained in step (a) containing a thermally cross-linkable hydrophilic gel precursor into a liquid phase which has a temperature suitable to thermally cross-link the gel precursor in order to form discrete gel particles; and (b3) introducing a dispersion obtained in step (a) containing a precursor of a hydrophilic gel cross-linkable by a cross-linking agent into a solution containing said cross-linking agent or working said cross-linking agent into the dispersion.

According to a preferred aspect of the process of the invention, a process is provided further comprising (c) coating particles obtained in the aforementioned step (b) with a substantially water-insoluble, ion-permeable shell.

According to another aspect of the invention a process is provided for separating metal cations from an aqueous solution comprising the step of contacting said solution with a particulate material comprising a non-ionic, non-polymeric complexing agent, which complexes with the metal cations, dispersed in a continuous aqueous phase which is embedded in a hydrophilic gel or is a component of a hydrophilic gel or is encapsulated by a water-insoluble, ion-permeable shell.

DETAILED DESCRIPTION OF PREFERRED EMBODIMENTS

The particulate material of the invention suitable for selective removal of metal cations from aqueous solutions contains a non-ionic, non-polymeric agent, which complexes with the metal cations, dispersed in a continuous aqueous phase, which is embedded in a hydrophilic gel and/or is a component of a hydrophilic gel and/or is enclosed by a water-insoluble, ion-permeable shell.

The term "non-polymeric" is understood within the scope of the present invention to mean that the agent molecule may have a maximum of 9 repeating monomer units. Preferably the complexing agent is a monomeric substance or a dimeric substance. Advantageously the molecular weight of the complexing agent lies under about 1000 Daltons.

The term "non-ionic" is understood within the scope of the present invention to mean that the coupling of metal cations to functional groups of the complexing agent does not take place through ionic bonding. The complexing agents utilized in accordance with the invention form at least one coordinate bond to the metal ion.

The complexing agent contained in the material of the invention may be composed of a single compound suitable for complexing with metal cations, or it may be composed of mixtures of several complexing compounds.

Organic, water-insoluble, metal cation complexing agents usable in accordance with the invention are known to persons skilled in the art. They may contain one or more functional groups suitable for forming complexes. The formation of complexes with metal cations takes place through atoms having one or more free electron pairs, particularly through nitrogen, phosphorus, oxygen, sulfur or selenium atoms. Examples of suitable functional groups are amino groups, phosphino groups, hydroxy groups, mercapto groups, keto groups, thioketo groups, selenoketo groups, ether groups and oxime groups. Further functional groups in complexing agents are the oxy acid groups as well as their esters and amides, particularly carboxyl groups, sulfonyl groups, phosphonyl groups and ester and amide derivatives thereof. Possible amides are, in particular, the N-monosubstituted or N-bisubstituted amides, whereby $C_4$- to $C_{15}$- alkyl groups are suitable as substituents. Possible esters are alkyl esters, particularly $C_4$- to $C_{15}$- alkyl esters. The agents are monodentates or multidentates depending on the number of functional groups capable of forming complexes.

For example, the known acidic, basic or solvating extraction agents used in hydrometallurgy can be used as metal cation complexing agents, c.f., for example, Cox, M. and Flett, D., *Chem. Ind.*, pages 118 to 193 (1987).

Acidic extraction agents usable in accordance with the invention include, for example, alkyl- or arylcarboxylic acids. In this context "alkyl" refers to longer chain, optionally branched aliphatic residues, preferably having a $C_5$ to $C_{15}$- chain. "Aryl" refers to an optionally substituted aromatic residue, especially phenyl or naphthyl, particularly the naphthenic acids suitable for Cu/Ni separation. Also included herein are phosphoric, phosphonic, thiophosphoric or thiophosphonic derivatives, for example alkylphosphoric acids, alkylphosphonic acids, or O,O-dialkyldithiophosphoric acids. Possible alkyl residues in this context include, for example, longer chain, optionally branched aliphatic residues, particularly $C_4$- to $C_{12}$- alkyl, for example, n-octyl or 2-ethylhexyl. The bis-(2-ethylhexyl)-phosphoric acids suitable for europium extraction may be mentioned in particular.

Known chelating acid extraction agents may also be contained in the material of the invention dispersed as complexing agents. In this case, for example, diketones, especially β-diketones, their thio and seleno analogues and derivatives thereof may be mentioned as examples. Such diketone derivatives have the general formula (I)

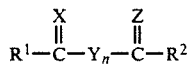  (I)

wherein
$R^1$ and $R^2$ each independently of each other represent H; optionally branched and/or substituted alkyl with 1 to 20, preferably 1 to 6, C-atoms; optionally substituted phenyl or an amino group $NR^3R^4$, wherein $R^3$ and $R^4$ represent H; optionally branched and/or substituted alkyl with 1 to 15, preferably 1 to 7, C-atoms, particularly ethyl, n-butyl, n-hexyl; phenyl or substituted phenyl, X and Z independently of each other represent O, S or Se, whereby preferably one of the two is O, Y represents —$CH_2$— or —NH—, whereby —NH— is preferred, and n represents 0, 1 or 2, preferably 1.

Diketone derivatives of the general formula (I) are particularly preferred in which $R^1$ represents lower alkyl or phenyl or an amino group $NR^3R^4$ wherein $R^3$ and $R^4$ represent alkyl with 1 to 6 C-atoms or phenyl, $R^2$ represents phenyl, one of X and Z represents O and the other represents O, S or Se, Y represents —NH—, and n represents 1.

Examples of compounds of formula (I) in which Y is an —NH— group and $R^1$ is an amino group $NR^3R^4$ include acyl substituted urea, thiourea and selenourea derivatives, particularly N'-alkylcarbonyl- and N'-benzoyl- substituted derivatives. The N-alkyl- or N-aryl-substituted derivatives suitable for separating noble metals are preferred, particularly the N,N-dialkyl-N'-benzoylthioureas, such as N,N-di-n-hexyl- and N,N-di-n-butyl- derivatives, and further N,N-disubstituted-N'-benzoylselenoureas, wherein possible substituents include, for example, ethyl-, n-butyl- and phenyl-groups. Further examples of useful diketone derivatives are acyl substituted acetamides or thioacetamides, particularly the 2-benzoylthioacetamides suitable for separating nickel, cobalt, copper, zinc and cadmium, for example N-phenyl-2-benzoylthioacetamide.

Further possible complexing agents include the quinoline derivatives known as acidic, chelating extraction agents. Particular mention may be made of the 8-hydroxy derivatives as well as their thio- and seleno-analogues. In addition to the unsubstituted compounds, substituted compounds may also be used, particularly the compounds substituted by alkyl residues at the $C_7$-atom. The latter compounds include, for example, the known 7-alkyl-8-hydroxyquinolines. Here alkyl refers to optionally branched and/or substituted longer chain residues with 6 to 20 C-atoms, particularly 8 to 12 C-atoms. Examples which may be mentioned include the 7-ethylhexyl derivative (Kelex 108 ®, Schering AG), the 7-(1-methyl-4-ethyloctyl)- derivative (Kelex 100 ®, Schering AG), as well as the 7-dodecenyl derivative (Kelex 100 ®, Ashland Chemical Co.).

Known complexing oximes and dioximes, for example, can also be used as complexing agents, particularly oximes of the general formula (II) having a hydroxy group in the α-position and oximes of the general formula (III) having a hydroxy group in the β-position:

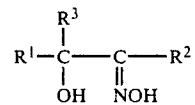  (II)

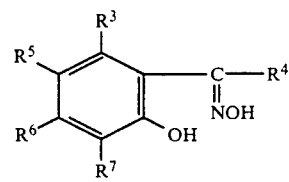  (III)

(a) wherein $R^1$, $R^2$, $R^3$ and $R^4$ may be the same or different and represent hydrogen atoms; straight chain or branched alkyl with 1 to 12 C-atoms optionally substituted by halogen, aryl, particularly phenyl, or by $NO_2$-groups; aryl, particularly phenyl, optionally substituted by alkyl, halogen or $NO_2$-groups, and (b) $R^5$, $R^6$, $R^7$ and $R^8$ may be the same or different and represent hydrogen atoms; halogen; straight chain or branched alkyl with 1 to 30 C-atoms optionally substituted by halogen or $NO_2$-groups.

Especially well suited are compounds of the general formula (IV)

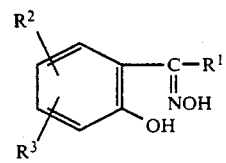  (IV)

wherein

R¹ represents H; alkyl with 1 to 3 C-atoms which optionally may be substituted, or phenyl which optionally may be substituted, R² represents longer chain, optionally branched alkyl with 6 to 30 C-atoms, preferably with 8 to 15 C-atoms, preferably in the 5-position; aryl which optionally may be substituted, preferably in the 5-position, and R³ represents H; halogen, preferably Cl, particularly in the 3-position.

Compounds which may be mentioned as examples include 2-hydroxy-5-alkylacetophenonoximes, especially that in which alkyl is t-nonyl (SME 529 ®, Producer: Shell) as well as 3-Cl-5-nonyl-2-hydroxyphenylketooxime (LIX 70 ®, Producer: Henkel Corp.).

Besides the previously mentioned acidic extraction agents, it is also possible to use basic extraction agents as metal cation complexing agents. These are also known to persons skilled in the art. They include, for example, water-insoluble primary, secondary or tertiary amines, diamines or oligoamines. Possible substituents preferably include longer chain, optionally branched alkyl groups with 4 to 20 C-atoms. Of the many known basic extraction agents, diisotridecylamine (HOE F 2562 ®, Hoechst AG) may be mentioned here as one example.

Besides the acidic or basic extraction agents, water-insoluble, solvating extraction agents can also be used as metal cation complexing agents within the scope of the present invention. Among these are included, for example, known phosphoric acid derivatives of the general formula (V)

$$R_m(RX)_nPX \qquad (V)$$

wherein R = linear or branched, optionally substituted alkyl with 3 to 12 C-atoms, or optionally substituted aryl, particularly phenyl, X = O, S,
m = 0 to 3
n = 3 to 0 with m + n = 3.

Mention may be made, for example, of the derivatives tri-n-butylphosphate or tri-n-octylphosphinoxide, which are suitable for uranium extraction.

Also usable as complexing agents are cyclic compounds belonging to the solvating extraction agents comprising 2 to 9 units of the general formula

$$(-RX-) \qquad (VI)$$

wherein

R represents in the individual units independently of each other lower alkylene, particularly ethylene, trimethylene, optionally substituted by oxygen and/or straight chain or branched alkyl with 10 to 20, preferably 15 to 17, C-atoms; optionally substituted o-phenylene groups, preferably lower alkyl substituted o-phenylene groups, particularly o-phenylene substituted in the 4-position, especially 4-butyl-o-phenylene, and X represents in the individual units independently of each other O, S or NH.

For example, known cyclic ethers with 2 to 9 —O—CH₂—CH₂—, —O—CH₂—CH₂—CH₂— or —O—o—phenylene units can be used as well as their derivatives, for example, their N-analogues or S-analogues, such as the crown ether 8,9,17,18-di(4-t-butylbenzo)-1,7-dithia-18-crown-6, or further dioxocyclam and its derivatives.

Persons skilled in the art know that the selectivity of the complexing agents which can be used to separate metal cations from aqueous solutions depends substantially on the chemical structure of the complexing agent as well as in appropriate cases on the pH value and temperature of the aqueous solution.

Persons skilled in the art also know under which pH and temperature conditions the known complexing agents selectively remove specific metal cations.

Since the selectivity of the complexing agents does not change when used in the material of the present invention, persons skilled in the art will know which complexing agents must be used to produce a material for removing a desired metal and under which pH and temperature conditions the material is to be used for selective removal of metal cations.

For example, it is possible through use of certain N,N-dialkyl-N'-benzoylthioureas (alkyl=ethyl-, n-hexyl-, n-butyl-) and variations of the pH value to selectively separate palladium group metals from each other.

Materials according to the invention which contain N-phenyl- and N-butyl-2-acylthioacetamide can, with variations in the pH value, selectively remove Ni, Co, Cu, Zn, Cd ions from aqueous solutions.

Materials according to the invention containing 7-alkyl-8-hydroxyquinoline (Kelex-types from Schering AG and from Ashland Chemical Co.) can selectively separate ions of Cu, Co, Zn, Cd, Mo from each other with variations in the pH value and can remove Sb, As, Ga or Ge from impurities.

If the material of the invention contains 2-hydroxy-5-t-nonylacetophenone oxime (Shell SME 529), then Cu- and conditionally Ni- ions can be selectively separated from other metal cations.

Special crown ethers, cf. K Gloe et al, *Z. Chem.* 26, p. 109–10 (1986) or cyclic amino compounds, cf. E. Kinura, *J. Chem. Comm.* 1986, p. 1020–22 can also function as selective complexing agents.

It should again be noted that the foregoing metal cation complexing agents only represent an incomplete selection of the agents known to persons skilled in the art which can be used. A prerequisite for usability in the material of the invention is that the agent in question is sufficiently poorly soluble in water. For example, complexing agents have proved to be advantageous whose solubility in water is less than about 10 mg/l.

The complexing agent itself can be present in the aqueous phase in emulsified or suspended form. However, a solution of the complexing agent in a water-insoluble solvent can also be dispersed in the aqueous phase. Suitable solvents for the agent include in particular aliphatic or cycloaliphatic hydrocarbons having higher boiling points, for example from about 120° C. to about 300° C., in pure form or as a mixture. Kerosene, for example, is very suitable. The material of the invention may contain the solvent in an amount of from 0 to about 40 wt.-%, based on the total weight of the prepared material.

Insofar as a water-insoluble solvent is contained in the material of the invention, the relationship between the amounts of solvent and complexing agent can vary within a wide range, for example from about 0.1 l to about 10:1, preferably from about 0.2:1 to about 2:1.

If desired, the complexing agent also can first be coupled onto a solid carrier material, for example, physically by hydrophobic interaction through longer C-carbon chains, and the carrier material with the agent coupled thereto then can be suspended in the aqueous phase. This manner of operation is particularly suitable for those agents which themselves are weakly water-soluble and for agents whose solubility in water ranges up to about 1000 mg/l. By coupling these agents with the solid carrier material, leaching or bleeding of the agents out from the material of the invention can be prevented.

Possible carrier materials include known solid materials with hydrophobic surfaces. For example finely milled ceramic materials, e.g. having a particle size of about 0.01 to 10 micrometers, particularly 0.1 to 2 micrometers, can be utilized, particularly materials based on silicon dioxide. Hydrophobic silicon dioxide aerogels are very suitable. Such aerogels contain on their surface, for example, alkyl-, dialkyl- or trialkylsilyl groups which are chemically bonded to the carrier through one, two or three oxygen atoms. The alkyl groups may be $C_1$ to approximately $C_{12}$ alkyl groups. A silicon dioxide aerogel in which octylsilyl groups are chemically bonded to the surface of the carrier is especially suitable. Such an aerogel is commercially available under the name Aerosil R 805 ® from Degussa AG, Frankfurt, Germany.

In the particles of the invention, the continuous aqueous phase which contains the dispersed complexing agent may be a component of a hydrogel, or it may be embedded in a hydrophilic gel. The continuous phase may thus be freely movable within the gel, or it may be present in substantially localized, bound form.

All cross-linked inorganic or organic hydrogels can be utilized as hydrophilic gels in accordance with the invention, whereby organic, hydrophilic, cross-linked gels are preferred.

Inorganic hydrogels are known per se to persons skilled in the art, cf., for example, A. Kuhn, *Kolloid-chemisches Taschenbuch* (Colloid Chemistry Handbook), Geest und Portig KG, Leipzig 1948, p. 335–48. Inorganic gels which may suitably be used in accordance with the invention include, for example, silicon oxide containing gels such as silicic acid, aluminum oxide containing gels such as aluminum oxyhydrates, mixtures of the two such as silicic acid-aluminum oxide (silica-alumina), or montmorillonite and bentonite.

The inorganic gels are obtained in a known manner by cross-linking corresponding gel precursors, for example, water-soluble, acid cross-linkable alkali metal silicates or aluminates such as water glass or sodium aluminate, or base gellable silicon or aluminum salts such a $SiCl_4$ or $AlCl_3$.

Organic hydrophilic gels include covalently and noncovalently cross-linked gels and are likewise known per se to persons skilled in the art, for example from B. Vollmert, *Grundriss der Makromolekularen Chemie* (Basis of Macromolecular Chemistry), E. Vollmert-Verlag, Karlsruhe 1979. The gels are formed in a known manner by cross-linking corresponding cross-linkable gel precursors (=gel formers). The gel formers can be cross-linkable thermally, i.e. through the action of heat or of cold, or they may be cross-linkable with the aid of a cross-linking agent. Gels cross-linkable with cross-linking agents include non-covalently cross-linked gels which are formed from corresponding ionotropic gel formers by cross-linking under the influence of metal cations or of anions or changes in the pH value, and covalently cross-linked gels whose precursors cross-link during the reaction with the cross-linking agent by formation of covalent bonds.

Many known natural products of animal, plant or bacterial origin can be used as gel precursors of hydrophilic organic gels. Gelable products of animal origin include, for example, polypeptides, such a gelatine Gelable products of plant origin include, for example, many polysaccharides, e.g. pectinate, carrageenan, agar or agarose. Bacterially obtainable polysaccharides include, for example, curdlan or gellan.

The gel formers also include many modified, i.e. chemically changed, natural products. The modification may take place through alkylation, dealkylation, carboxylation, decarboxylation, acetylation or deacetylation, etc. Examples of such modified gel formers which may be mentioned include cellulose derivatives such as cellulose sulfate or carboxymethylcellulose, partially deacetylated gellan, further gelable amino sugar containing polysaccharides, such as the chitosan obtained by partial deacetylation of chitin.

Examples of gel formers for thermally cross-linked gels which may be mentioned include polypeptides, such as gelatine, and optionally modified polysaccharides, such as agar, curdlan or agarose.

The gel formers cross-linkable by a cross-linking agent include the inorganic precursors and the organic, ionotropic gel formers cross-linkable by ions.

Preferred ionotropic gel formers of gels which are cross-linked by cations (suitable ions listed in parentheses) have a chain of polymeric saccharides as a backbone. As functional groups they may have the carboxyl group, such as alginate ($Ca^{2+}$, $Al^{3+}$, $Zn^{2+}$), pectate ($Mg^{2+}$, $Ca^{2+}$), carboxymethylcellulose ($Al^{3+}$); the phosphonyl group, such as phosphoguar gum ($Ca^{2+}$, $Al^{3+}$), or the sulfonyl group, such as carrageenan ($K^+$, $Ca^{2+}$) and cellulose sulfate ($K^+$). Further, mention may be made of gellan which is cross-linkable by $Na^+$, $K^+$, $Ca^{2+}$, $Mg^{2+}$ or $Al^{3+}$, and which can also be utilized in deacetylated form.

Preferred ionotropic gel formers of gels cross-linkable by anions have a chain of amino sugar containing polysaccharides as a backbone. As functional groups they may have the amino group which is anionically cross-linkable in protonated form. One or more hydrogen atoms of the amino group may be substituted, for example by alkyl residues or acetyl groups. Mentionable as an example is chitosan, which can be cross-linked by polyphosphates, hexacyanoferrate (II) and hexacyanoferrate (III) among others.

By decreasing the pH-value, that is by addition of an acid, ionotropic gel formers can be gelled which have acid residues as functional groups, for example, the carboxyl group, the phosphonyl group or the sulfonyl group. Notable examples include appropriately substituted polysaccharides, such as alginates and pectates, from which alginic acid or polyglactouronic acid forms.

By increasing the pH-value, that is by addition of a base, ionotropic gel formers with amino sugar containing polysaccharides, such as chitosan, are gelled.

Covalently cross-linked, hydrophilic, organic gels usable in the invention can be produced from prepolymers in a known manner by polyreactions such as polycondensation, polyaddition or polymerization, preferably by polycondensation or polyaddition. Preferred hydrophilic polymers obtained by polyaddition are appropriately substituted polyurethanes (PU) and polyureas.

Suitable PU prepolymers include, for example, the types Hypol ® FHP 2000, 3000 or 4000 from the Grace Co., Lexington.

Possible covalently cross-linked gels which may be contained in the material of the invention further include ionotropic gel formers covalently cross-linked by suitable cross-linking agents and having an amino sugar containing polysaccharide backbone, for example chitosan, or thermally cross-linkable gel formers which have a polypeptide backbone, for example gelatine. Suitable cross-linking agents are known in the art. They contain two or more functional groups which cross-link amines, mentionable examples of which include the aldehyde, isocyanate, thioisocyanate and azo groups. Difunctional cross-linking agents are utilized which are water soluble, but which, however, do not react or react only slowly with water. Examples which may be particularly mentioned include diisocyanates, such as toluene diisocyanate, as well as dialdehydes, such as glutardialdehyde. Gels of chitosan cross-linked with glutardialdehyde are especially suitable.

Insofar as the aqueous phase containing the dispersed complexing agent is not a component of a hydrophilic gel or is not embedded in a hydrophilic gel, it must be surrounded by a water-insoluble, ion-permeable shell. In order to increase the particle stability, it may be advantageous to surround this shell with another, supplemental water-insoluble, ion-permeable shell.

It is advantageous to also utilize a supplemental, water-insoluble, ion-permeable shell when the continuous aqueous phase is embedded in a gel or is a component of a gel. The shell produces an increased mechanical stability. In addition, leaching out of the complexing agent into the aqueous solution to be purified is avoided by encasing the gel body in a shell. This is particularly important when the agent is liquid or is present in dissolved form in a solvent. It may also be necessary to shield the gel structure against contact with harmful impurities in the water. Insofar as a reprocessing or a working-up of the ion-laden material is contemplated, it is likewise advantageous to encase the gel in a shell.

The shell, which preferably is free of the complexing agent, may comprise the hydrophilic, cross-linked gels already described above, with hydrophilic, organic, cross-linked gels being preferred, particularly ionotropic cross-linked gels and covalent cross-linked gels.

In addition to the already described, ionotropically cross-linked gels, suitable ionotropically cross-linked shell materials also include other ion-permeable materials, for example gels which are obtained by cross-linking two different ionotropic gel precursors having functional groups of varying polarity with each other. Examples which may be mentioned include gels obtained from chitosan cross-linked, for example, with alginate, pectate, carboxymethylcellulose, phosphoguar gum, carrageenan, and/or cellulose sulfate.

The shells can also be formed from covalently cross-linked gels, for example involving a urea-formaldehyde polymer.

It is possible to further reinforce or strengthen gels contained in the material of the invention and/or in the shell material by chemical modification.

For example, ionotropic gels or corresponding shell material cross-linked by cations may be treated with acid. The gel or shell material then contains free, insoluble acids, for example, alginic acid or polyglactouronic acid.

Amino sugar-containing gels or corresponding shell material cross-linked by anions, for example chitosan gel ionotropically cross-linked by tripolyphosphate, may be treated, for example, with base. The gel or shell material then contains deprotonated, insoluble chitosan.

It is further possible to strengthen amino sugar-containing, ionotropically cross-linked gels by forming derivatives. For example, chitosan cross-linked by tripolyphosphate may be acetylated. The gel or shell material then contains poorly soluble chitin.

It is additionally possible to strengthen a non-covalently cross-linked gel or shell material by supplemental covalent cross-linking. It can be particularly advantageous to strengthen a non-covalently cross-linked shell material by supplemental covalent cross-linking. For example, an amino group-containing shell material can be strengthened by supplemental covalent cross-linking by means of one of the amine cross-linking agents previously described above. Thus, for example, polypeptides, e.g. gelatin, or amino sugar-containing polysaccharides, such as chitosan, ionotropically cross-linked with tripolyphosphate or hexacyanoferrate, can be supplementally covalently cross-linked by means of glutaraldehyde.

A particularly preferred material comprises a dispersion of the complexing agent dispersed in the aqueous phase, which is embedded in a thermally cross-linked gel, particularly agar or agarose, with a shell, obtainable by covalent cross-linking of an amino sugar-containing polysaccharide, particularly chitosan, with a bis-functional cross-linking agent, preferably glutaraldehyde.

If desired, the continuous aqueous phase and optionally also the ion-permeable shell which surrounds it, may contain one or more conventional auxiliary agents for modifying the particle characteristics. Substances which may be included as auxiliary agents include, in particular, viscosity modifying, preferably viscosity increasing, agents; density modifying agents; agents which influence the pH-value, as well as surface tension modifying agents.

Possible viscosity increasing agents include the compounds already described as ionotropic gel formers. Polysaccharides substituted by carboxyl groups are particularly suitable For example carboxymethyl-cellulose, as well as derivatives thereof, such as carboxymethylcellulose ethers.

Possible agents for decreasing the density include materials with a density less than 0.9 g/cm$^3$. These may be, for example, water-insoluble solids, such as foamed synthetic plastics or foamed glass, or organic water-insoluble substances, for example the aliphatic hydrocarbons which are simultaneously usable as solvents for the complexing agents, particularly kerosene. Water-insoluble agents preferably having a density greater than 2 g/cm$^3$, for example, heavy spar (barite) or titanium dioxide, may be utilized as density increasing agents.

Conventional surfactants (tensides) are utilized as surface tension modifying agents. Emulsifiers having an HLB-value (hydrophilic-lipophilic balance value) greater than 8, preferably between 8 and 18, are advantageous. These are oil-in-water emulsifiers. Examples of suitable emulsifiers are found in Fiedler H.P., *Lexikon der Hilfstoffe fuer Pharmacie, Kosmetic und angrenzende Gebiete* (Dictionary of Auxiliary Agents for Pharmacy, Cosmetics and Adjacent Areas), Aulendorf (1971) pp. 265–270. Examples of usable emulsifiers include fatty acid esters, e.g. polyoxyethylene monolaurate (PEG-300), polyoxyethylene(20)-sorbitan tristearate (Tween 65), sulfonates, e.g. alkylarylsulfonates (G-3300), amine salts such as didodecyldimethylammonium chloride, non-ionic alkyl polyglycol ethers, e.g. Emulsogen LP from Hoechst AG, or combinations of anionic compounds with solvation promoters, e.g. Emulsogen L from Hoechst AG.

The material according to the invention is preferably formed in substantially spherical, rod-like or strand-like form.

The diameter of the spheres lies in the range between 0.1 and 6 mm. Preferably the diameter amounts to approximately 1.5 mm. If the material of the invention is rod-like in form, the diameter of the rods amounts to 0.1 to 6 mm, preferably 1 to 1.5 mm, and the length amounts to 2 to 30 mm, preferably 8 to 12 mm. The material of the invention may also be provided in the form of strands, the diameter of which may amount to from 0.1 to approximately 6 mm, preferably 0.5 to 3 mm.

The water content of the particulate material lies between about 40 and 90 weight %. The proportion of metal-cation complexing agent in the finished gel amounts to about 1 to 50 weight %. The proportion of gel former amounts to about 0.5 to 30 weight %. The proportion of conventional auxiliary agents amounts to between 0 and about 10 weight %; the content of water-insoluble solvent between 0 and about 40 weight %.

The material according to the invention possesses surprisingly advantageous characteristics. Accordingly, it is distinguished by high mechanical stability, particularly if the continuous aqueous phase is embedded in a hydrophilic organic gel or is a component of such a gel.

Through supplemental encapsulation of the discrete particles, the mechanical stability is increased even further In this way, as well as through the possible coupling of the complexing agents onto hydrophobic carrier materials, the danger of contamination of the aqueous solution to be treated with complexing agent can be avoided.

Further, it is a decisive advantage that the ion transport through the core and shell material present in each instance, takes place through water, which makes it possible for the ions to diffuse through channels, macropores, and micropores to the complexing agents. The large exchange surface between the complexing agent and the continuous aqueous phase which transports the cations which are to be removed, leads to high effectiveness of the material of the invention while maintaining the selectivity with simultaneously simple handling.

In the following, the production of the materials suitable for selective removal of metal ions from aqueous solutions is described.

The process for producing the material according to the invention is characterized in that (a) a complexing agent is dispersed in an aqueous phase, which contains a cross-linking agent, a precursor of a hydrophilic gel cross-linkable by cross-linking agent, or a thermally cross-linkable precursor of a hydrophilic gel;

(b) in order to form particles from the dispersion obtained under (a)

(b1) the dispersion containing a cross-linking agent is introduced in order to encapsulate it with a substantially water-insoluble ion-permeable shell into a solution which contains a precursor of a water-insoluble ion-permeable shell material cross-linkable by the cross-linking agent, or (b2) the dispersion containing a precursor of a hydrophilic gel thermally cross-linkable by heat or by cold is introduced in order to form discrete gel particles into a liquid phase which has a sufficiently high temperature to thermally cross-link the gel precursor or a sufficiently low temperature to thermally cross-link the gel precursor, or (b3) the dispersion containing a precursor of a hydrophilic gel cross-linkable by a cross-linking agent is introduced into a solution containing the cross-linking agent, or the cross-linking agent is worked into the dispersion, and optionally, (c) the resulting particles are coated with a substantially water-insoluble, ion-permeable shell and/or a shell of a non-covalently cross-linked, amino group containing shell material surrounding the particles is strengthened by supplemental covalent cross-linking.

The dispersion of the complexing agent in the aqueous phase may be effected in accordance with conventional methods for producing a dispersion, that is to say a suspension of solid agents or an emulsion of solid or liquid materials in an aqueous phase. Complexing agents present in solid form are preferably utilized as particles with a size between 0.1 to 500 $\mu$m. Complexing agents present in liquid form, optionally dissolved in water-insoluble solvents, are processed into an emulsion, for example, by high speed stirrers (turbo mixers), whereby the emulsified particles have a diameter from about 0.2 to about 50 $\mu$m.

Insofar as the production of the particles is to take place according to process variant (b1) and/or the particles are to be encapsulated with a shell in accordance with process step (c), inorganic or organic cross-linking agents can be added to the dispersion in step (a). The selection of the cross-linking agent depends on the gel formers which are used for the shell material.

From the group of inorganic cross-linking agents, mention may be made of tripolyphosphate and hexacyanoferrate, which cross-link ionotropic gel formers which, for example, have $NH_3^+$-groups, that is to say are provided with cationic functional groups. Further, mention may be made of salts, preferably salts of metals of Groups II and III of the periodic table, particularly calcium salts, as well as in appropriate cases potassium salts or ammonium salts, whereby in each case the chlorides are preferred. Such salts are cross-linking agents for ionotropic gel formers which contain oxy-acid residues, e.g. carboxyl groups, phosphonyl groups or sulfonyl groups as functional groups, that is to say are provided with anionic functional groups, such as, for example, alginates or pectates. Further, mention may be made of acids, e.g. HCl, which cross-link inorganic gel formers, e.g. water glass or aluminates, and also of ionotropic gel formers provided with anionic functional groups, e.g. alginates or pectates.

Also salts which themselves represent precursors of hydrophilic cross-linked gels, for example aluminates, e.g. sodium aluminate, or soluble silicates, e.g. water glass, may simultaneously be effective as cross-linking agents for the shell material.

The ionotropic gel formers already described above, which for their part represent precursors of organic, hydrophilic, cross-linked gels, can also additionally serve as cross-linking agents for producing shell material generated by cross-linking different gel formers with each other. In this context, ionotropic gel formers provided with cationic functional groups, for example, chitosan, function as cross-linking agents for ionotropic gel formers provided with anionic functional groups, for example, alginate, and conversely.

Inorganic or organic cross-linking agents which bring about a covalent cross-linking of gel-precursors, can likewise be utilized. These include the materials known to persons skilled in the art which bring about polymerization, polyaddition or polycondensation of precursors with the formation of hydrophilic, covalently cross-linked gels. If a polyurethane prepolymer is utilized as a gel former for the shell material, the water itself, optionally under the influence of reaction accelerators, may act as a cross-linking agent.

Examples of organic cross-linking agents which bring about covalent cross-linking include compounds which have functional groups which cross-link amines. Such groups include, for example, the aldehyde group, the isocyanate group, the thioisocyanate group, or the azo group. Preferably, bis-functional cross-linking agents are utilized which are water-soluble but which are unreactive with water or react only slowly with water. In particular, use may be made of diisocyanates, for example, toluene diisocyanate, or dialdehydes, for example, glutaraldehyde.

Insofar as the production of the particles is to take place in accordance with process variants (b2) or (b3), one of the gel formers described above will be added to the dispersion of step (a).

In step (b), particles are formed from the dispersion obtained in step (a).

Insofar as the dispersion contains a cross-linking agent, the dispersion is introduced in order to encapsulate it with a substantially water-insoluble ion-permeable shell in accordance with step (b1) into a solution which contains a gel precursor or a water-insoluble, ion-permeable shell material which is cross-linkable by the cross-linking agent. Preferably an aqueous solution is utilized as the solution. The introduction may be effected, for example, through dripping (i.e. drop-wise addition) or injection.

Preferred combinations of cross-linking agents/organic cross-linkable precursors are salt/ionotropic gel formers, as well as cationic (anionic) cross-linkable ionotropic gel formers/ionic (cationic) cross-linkable ionotropic gel formers.

Insofar as the dispersion contains a precursor of a hydrophilic gel which is thermally cross-linkable by heat or by cold, it is introduced in order to form discrete gel particles according to step (b2) into a liquid phase which has a sufficiently high temperature to thermally cross-link the gel precursor, or which has a sufficiently low temperature to thermally cross-link the gel precursor. The introduction may be effected, for example, through dripping or injection. Insofar as a gel precursor which is cross-linkable by cold is utilized, aliphatic hydrocarbons, e.g. hexane, or hydrocarbon mixtures such as kerosene, are utilized as the liquid phase. Preferably, however, the liquid phase is water. Insofar as a gel-precursor which is cross-linkable by heat is utilized, a higher boiling, water-insoluble organic hydrocarbon, e.g. kerosene, or a silicone oil is utilized as the liquid phase.

The temperature needed for cross-linking depends on the particular gel-precursor being used in an given case and is within the skill of the art. For curdlan, for example, the temperature is about 65° C. Preferably the thermal cross-linking is carried out, however, at a temperature which is substantially higher than that temperature which is barely sufficient, for example, at a temperature which is higher by about 15° C. to 60° C.

As a sufficiently low temperature for use with gels which are thermally cross-linkable by cold, a target temperature is chosen which is at least 15° C. lower than the temperature at which the gel is transformed into the dissolved state. The temperature at which this transition takes place depends upon the particular gel used in each case and is known to persons skilled in the art.

Insofar as the dispersion obtained in step (a) contains a precursor of a hydrophilic gel which is cross-linkable by a cross-linking agent, the dispersion is introduced in accordance with step (b3) into a solution containing the cross-linking agent, or the cross-linking agent is worked into the dispersion. The introduction of the dispersion into the solution can, for example, take place through dripping or injection, or in particular is carried out when an ionotropic gel former is utilized as the cross-linkable precursor. The working in of the cross-linking agent into the dispersion, can for example, take place through intimate mixing. This approach should be considered when the cross-linking is a polyreaction, that is to say, a polymerization, polyaddition, or polycondensation.

The particles obtained in steps (b1), (b2), or (b3) may, if desired, be coated with a substantially water-insoluble ion-permeable shell in step c) and /or a shell of a non-covalently cross-linked amino group containing shell material surrounding the particles may be strengthened by supplemental covalent cross-linking.

In order to coat the gel particles, they may, for example, be contacted with a solution containing a cross-linking agent, for example by dipping or injection. Particles which have been pretreated in this manner are subsequently contacted, for example again by dipping or injection, with a solution which contains a gel-precursor for the shell material which is cross-linkable by the cross-linking agent being used. The desired shell is produced through the reaction between the cross-linking agent and the cross-linkable precursor.

Preferably the particles are first contacted with a solution containing a cross-linkable gel-precursor of the shell material, and this cross-linkable gel-precursor is subsequently cross-linked. The cross-linking may be effected in a known manner. Depending on the type of gel former used, the cross-linking may, for example, be carried out through gel formation by thermal cross-linking or by contact with a suitable cross-linking agent as described above.

Preferably the particles are surrounded with a hydrophilic, organic ionotropic gel former, for example, by dipping in a solution containing such a gel former. Subsequently, the particles are immersed in a suitable cross-linking bath.

The cross-linking of the gel-precursor of the gel material may also be initiated through diffusion of a cross-linking agent contained in the particle to the surface.

If desired, the gel of the core material and/or shell material may be chemically modified in order to strengthen it. For example, cationically cross-linked ionotropic gels may be contacted with an acid to produce gels which contain the insoluble free acid of the gel material being used. In this way, for example a calcium alginate gel may be converted by the acid into an alginic acid gel.

Further, anionically cross-linked ionotropic gels can be contacted with a base to produce gels which contain the insoluble free base of the gel material being used. In this way, for example, a chitosan gel containing ammonium groups cross-linked with tripolyphosphate may be converted into an insoluble chitosan gel containing free amino groups.

There is also the possibility of converting anionically cross-linked ionotropic gels into poorly-soluble derivatives. In this way, for example, a chitosan gel cross-linked with tripolyphosphate may be converted by acetylation into a chitin gel.

Finally, gels containing non-covalently cross-linked amino groups may be contacted in order to additionally strengthen them with a cross-linking agent which is capable of covalently cross-linking amino groups.

In one preferred embodiment, particles obtained in accordance with the invention with a non-covalently cross-linked shell material containing amino groups are contacted in order to additionally covalently strengthen the shell with a cross-linking agent which is capable of cross-linking amino groups.

The non-covalently cross-linked shell material may, for example, be a thermally cross-linked polypeptide, such as gelatin, or an amino sugar containing polysaccharide, such as chitosan, which is ionotropically cross-linked by means of anions, e.g. sodium tripolyphosphate. Among the previously mentioned cross-linking agents, glutaraldehyde in aqueous solution is particularly suitable. The contacting may, for example, be carried out by dipping or injection the particles.

A gel-containing, encapsulated particle can be produced in a single step (=one-stage production). One embodiment for one-stage production of a gel-containing, encapsulated particle is characterized in that a dispersion obtained in step (a), which contains a cross-linkable precursor of the gel to be formed in the particle, and a second liquid, which contains a gel precursor of the shell material, are introduced together into a third liquid in such a way that the dispersion is surrounded by the second liquid.

This may take place if the dispersion obtained in step (a) is introduced through a nozzle which is surrounded by a conduit through which the second liquid is supplied. The term "introducing" is particularly understood to include dripping and injection.

In the dispersion of step (a) and in the second liquid, gel precursors may be utilized which are cross-linkable in various ways; the combination of precursors cross-linkable by heat and cross-linkable by cold is excluded, however. For example, a precursor cross-linkable by a cross-linking agent may be provided in the dispersion of step (a) and a thermally cross-linkable precursor of a gel may be provided in the second liquid. One could also, for example, use a thermally cross-linkable gel-precursor in the dispersion of step (a) and a gel-precursor cross-linkable by a cross-linking agent in the second liquid. The cross-linking agent may then be contained in the third liquid and/or in the dispersion of step (a) which contains the thermally cross-linkable gel-precursor.

Preferably precursors which cross-link in the same way are used in the dispersion of step (a) and in the second liquid. These may be precursors which are each thermally cross-linkable by heat or precursors which are each thermally cross-linkable by cold. In this case, the third liquid is a liquid phase which is sufficiently cold or sufficiently warm to effect thermal cross-linking. Gel-precursors can also be used which are cross-linked by a cross-linking agent, particularly the already mentioned ionotropic gel formers. In this case the third liquid contains an appropriate cross-linking agent.

Another embodiment for one-stage production of gel-containing, encapsulated particles in a single stage is especially suitable for production of particles in which a thermally cross-linked gel is encapsulated with a shell of an ionotropically cross-linked gel.

This embodiment is characterized in that a dispersion obtained in step (a) which contains a thermally cross-linkable precursor of the gel to be formed in the particle and a cross-linking agent which is capable of cross-linking ionotropic gel-precursors, is introduced into an aqueous solution of an ionotropically cross-linkable gel precursor for the shell material which is sufficiently cold or sufficiently warm to effect thermal cross-linking.

The introduction may take place, for example, through dripping or injection. Upon introduction of the dispersion into the aqueous solution, the thermal cross-linking and the ionotropic cross-linking simultaneously start to occur. Discrete, gel-containing particles which are encapsulated with an ionotropically cross-linked gel free of complex formers are thereby formed in one step.

Use may be made of the already described thermally cross-linkable or ionotropically cross-linkable gel precursors as well as corresponding cross-linking agents. Preferably, the dispersion of step (a) includes a precursor for the gel which is thermally cross-linkable by cold, e.g. agar, as well as an anionic cross-linking agent for the shell material, e.g. sodium tripolyphosphate. Preferably an amino sugar containing polysaccharide is used as the ionotropically cross-linkable gel precursor of the shell material. The material of the invention obtained through this preferred embodiment of the production process comprises discrete particles with a thermally cross-linked core and an ionotropically cross-linked amino group containing shell.

If desired, the discrete particles may be chemically modified as described above in order to strengthen the shells, particularly by covalent cross-linking with a cross-linking agent. The discrete particles obtained in this way have a thermally cross-linked core and a covalently cross-linked shell.

If desired, a conventional auxiliary agent which modifies the viscosity, the density and/or the surface tension may be added to the continuous aqueous phase which contains the dispersed complexing agent or to the solution which contains the cross-linkable gel precursor of the shell material.

The incorporation of auxiliary agents, which modify the viscosity, particularly those which increase the viscosity, serves to prevent the dispersion created in step (a) from losing the desired form or shape during cross-linking in step (b). The adjustment of the viscosity is especially important with thermally cross-linkable precursors. The optimum amount of viscosity increasing auxiliary agents depends on the temperature of the dispersion. It can be readily determined, however, by simple targeted experiments.

In the following, preferred embodiments of the production process designated hereinafter with Roman numerals, are explained in further detail.

In this context, following the description of the general operating procedure for each embodiment, ranges of useful conditions respecting ingredients and proportions are compiled in table form.

I. Production of a Material According to the Invention in Which the Continuous Aqueous Phase is Encased by an Ion-permeable Shell.

II. Production of a Material According to the Invention Which Contains a Hydrophilic, Non-covalently Cross-linked Gel.

III. Production of a Material According to the Invention Which Contains a Hydrophilic, Covalently Cross-linked Organic Gel.

IV. Coated Particles According to the Invention With a Substantially Water-insoluble, Ion-permeable Shell.

V. One-stage Process for Production of a Gel-containing Material According to the Invention Provided With an Ion-permeable Shell.

VI. Process for Strengthening a Non-covalently Cross-linked Shell Material Through Conversion Into a Covalently Cross-linked Shell Material.

The particles obtained in this way may, if desired, be washed again with distilled water to further clean them and/or may be sorted according to size.

In the description of the individual embodiments, the general term "dispersion" is utilized both for suspensions and also for emulsions. To begin with, the production of suspensions and emulsions of this type will be described.

(A1) Production of suspensions usable in accordance with the invention

Complexing agents which exist in solid form are, if necessary, first milled, for example in a cross hammer mill with sieving attachments of varying size until the particle size lies in the range from 0.1 to 500 μm. The powder which is obtained is subsequently mixed with the aqueous liquid phase containing the cross-linkable precursor or the cross-linking agent, whereby before, during or after the mixing, conventional auxiliary agents may be added, for example $BaSO_4$ or $TiO_2$ for increasing the density, foam glass or kerosene for decreasing the density, a surfactant, or a thicking agent. The mixing is effected with known devices, for example with stirrers.

(A2) Production of a suspension containing the complexing agent coupled to a hydrophobic carrier material The complexing agent is dissolved in an organic solvent, for example acetone. Subsequently, the solution is brought into contact with the hydrophobic carrier material, for example a hydrophobized silicon-aerogel, for example in a stirring reactor. One can also, for example, pour the solution of the agent through a column packed with the carrier material. The weight ratio of agent to carrier material should lie in the range from about 0.5:1 to 1.5:1, preferably at about 1:1.

The solvent is thereafter removed, and the resulting solid material is processed further as described under (A1).

(B) Production of Emulsions

Complexing agents which are present in liquid form, or optionally dissolved in water-insoluble solvents, are emulsified in the aqueous liquid phase containing a cross-linkable gel precursor or a cross-linking agent, optionally with the addition of modifying agents, for example thicking agents and/or surfactants, by using high speed stirrers, particularly turbo stirrers (Ultra-Turrax). The preferred particle size of the emulsified components lies between about 0.2 and 50 μm.

The sequence of addition of the cross-linkable gel precursors and the modifying agents is not critical. It is also possible to initially produce a concentrated emulsion, which optionally may contain the cross-linkable gel precursor, and thereafter bring the emulsion to the desired concentration by subsequent dilution.

In one embodiment, a modifying agent is added to the emulsion before or during the production process. For example, finely pulverized heavy spar or $TiO_2$ may be added in a concentration of up to 10 weight % of the final dispersion, for example from about 0.5 to 10 weight %; an emulsifier may be added up to about 3 weight %, for example 0.5 to 3 weight %; and/or an agent for modifying the viscosity, especially for increasing the viscosity, such as sodium alginate, carrageenan, sodium pectate, carboxymethylcellulose etc., may be added in a concentration up to about 5 weight %, for example from about 0.5 to 5 weight %, preferably about 2 to 2.5 weight %. It should be noted here that some of the substances utilized, for example the ionotropic organic gel formers, are produced from natural products and can vary in their properties (viscosity, gelability, etc.). The indicated percents are therefore to be understood only as approximate values.

I. Production of a Material According the Invention in Which the Continuous Aqueous Phase is Surrounded by an Ion-permeable, Water-insoluble Shell In a first step (a), a dispersion of a complexing agent in an aqueous solution of a cross-linking agent is produced in the previously described manner, optionally with addition of further modifying agents (heavy spar, surfactant, viscosity-increasing agents). The solution obtained thereby is dripped or injected in order to encapsulate it in accordance with step (b1) of the production process, into a solution which contains a gel precursor which is cross-linkable by the cross-linking agent. A shell thereby forms at the point of contact between the dispersion solution and the solution containing the gel precursor, and drops or strands stabilized by the shell material are obtained accordingly. After a post-reaction phase of about 10 to 20 minutes, the discrete particles which formed are sieved. They may be utilized directly as such, or they may be subjected to a further treatment, for example for strengthening the shell.

TABLE I

| | Material in Which the Continuous Aqueous Phase is Enclosed by an Ion-permeable, Water-insoluble Shell | | | | |
|---|---|---|---|---|---|
| Precursor of the Shell [wt. %][1] | Cross-linking Agent | Continuous Aqueous Phase | | | Auxiliary Agent [wt. %][1] |
| | | Concentration [wt. %][1] | Complexing Agent | Concentration [wt. %][1] | |
| Cationic cross-linkable, ionotropic gel former (0.5 to 5) | $CaCl_2$, $BaCl_2$, $MgCl_2$ | 0.5–5 (preferably about 2) | Suspended or emulsified, optionally dissolved in a solvent, e.g. mineral oil or kerosene, or coupled to hydrophobic carrier material | 1–50 (preferably 10–25) | Density modifying agent ($BaSO_4$, $TiO_2$, foam glass) 0–10 Emulsifier 0–3 |
| | Anionic cross-linkable gel former | 0.1–2 | | | |

TABLE I-continued

Material in Which the Continuous Aqueous Phase is
Enclosed by an Ion-permeable, Water-insoluble Shell

| Precursor of the Shell [wt. %][1] | Continuous Aqueous Phase | | | | |
|---|---|---|---|---|---|
| | Cross-linking Agent | Concentration [wt. %][1] | Complexing Agent | Concentration [wt. %][1] | Auxiliary Agent [wt. %][1] |
| Anionic cross-linkable gel former e.g. chitosan (0.5 to 5) | (chitosan) Cationic cross-linkable organic gel former (Alginate) | 0.1–2 | | | Hydrophobic milled silicate coupling material 0–25 |
| | Sodium tripoly-phosphate, K or Na hexacyano-ferrate (II), (III) | 0.2–4 | | | Viscosity modifying material 0–5 |
| | | | | | Solvent 0–25 |

[1]based on the total weight of the particles containing 40–90 wt. % water.

II. Production of a Material in Accordance with the Invention, the Particles of Which Contain a Hydrophilic, Non-covalently Cross-linked Gel In step (a), an aqueous dispersion of the respective complexing agent is initially produced as described above, which contains a cross-linkable gel former as well as optional further modifying agents. In step (b) particles are formed from the dispersion obtained in step (a).

For this purpose either a thermal cross-linking is undertaken in accordance with step (b2) or a cross-linking of a gel precursor by a cross-linking agent is effected according to step (b3), whereby acids, bases or salts are utilized as the cross-linking agent.

II.1. Formation of Hydrophilic, Non-covalently Cross-linked Organic Gels Through Temperature Change The thermally cross-linkable gel formers include those gel formers which are cross-linkable by heat, that is through increasing the temperature, and those gel formers which are cross-linkable by cold, that is through decreasing the temperature. From the first group, agar and agarose may be mentioned in particular, while an example of the second group is curdlan.

II.1.(a) Cross-linking by Decreasing the Temperature

Gelatin (10 to 30 weight %), agar or agarose (approximately 0.5 to 4 weight %) are added to water; the complexing agent is dispersed in the aqueous phase, and to this are optionally added further modifying agents, particularly viscosity increasing agents, for example carboxymethylcellulose (approximately 0.2 to 5 weight %). The dispersion is warmed to about 40° to 80° C. and dripped or injected into cold water, for example at about 15° C. Solid, discrete particles are thereby formed.

II.1.(b) Cross-linking by Increasing the Temperature

Curdlan (2 to 15 weight %) is suspended in water; the complexing agent is dispersed in the suspension, and conventional auxiliary agents are optionally added. The dispersion is then warmed until the curdlan dissolves, however not higher than about 0° C., and then dripped into hot oil, for example mineral or silicone oil (temperature about 80° to 120° C.). Solid particles immediately form which can be washed and utilized.

II.2. Gelation by Acid or Base

Inorganic gel formers which are gelable by acid (pH-reduction) include, for example, soluble silicates, particularly water glass, aluminates, particularly sodium aluminate, and cationically cross-linkable ionotropic gel formers, particularly sodium alginate or sodium pectate. Inorganic gel formers which are gelable by base (pH-increase) include gelable metal salts, for example $SiCl_4$ or $AlCl_3$. Organic gel formers which are cross-linkable by base include anionically cross-linkable ionotropic gel formers, particularly chitosan.

First the aqueous dispersion containing the gel former and the complexing agent is produced. If chitosan is used as the gel former, its dissolution in the dispersion can be aided in a known manner by addition of acid, for example acetic acid.

To form the gel, the completed dispersion is introduced into an aqueous solution of an acid, for example hydrochloric acid (about 1 Normal), or into an aqueous solution of a base, particularly sodium hydroxide (about 1 Normal). The desired particulate material is thereby obtained. Depending on the manner of operation, bead-form or strand-form particles can be produced. By dripping the gelable dispersion into the acid or base, bead-form particles are obtained, for example, while by injection, strands are obtained. By varying the dripping rate, drop size, spray speed, diameter of the injection nozzle, etc., the diameter of the drops and/or strands can be adjusted to the desired size. In order to complete the gelation process, which begins immediately, the discrete particles may be left in the acid or base for up to 30 minutes, whereby the gelation process and the post-reaction phase preferably take place at room temperature. Subsequently, the discrete particles are removed from the acid or base, for example by screening, and washed with water. The resulting particles may be used directly or subjected to a subsequent treatment, for example they may be provided with a supplemental, ion-permeable shell.

TABLE II.1

| | | Materials Containing Thermally Cross-linked Gels | | | |
|---|---|---|---|---|---|
| Gel Former | Concentration [wt. %][1] | Complexing Agent | Concentration [wt. %][1] | Auxiliary Agent | Concentration [wt. %][1] |
| Gelatine | 10 to 30 | suspended or emulsified, optionally dissolved in a solvent, e.g. mineral oil or kerosene, or coupled to a hydrophobic carrier material | 1 to 30 preferably 10 to 25 | Density increasing material, e.g. BaSO$_4$ or TiO$_2$ | 0 to 10 |
| Agar | 0.5 to 4 | | | Density decreasing material, e.g. kerosene or foamed glass | 0 to 10 |
| | | | | Solvent | 0 to 40 |
| Agarose | 0.5 to 4 | | | Emulsifier | 0 to 3 |
| Curdlan | 2 to 15 | | | Carrier material | 0 to 25 |

[1]based on the total weight of the particles containing 40 to 90 wt. % water.

TABLE II.2

| | | Materials containing Gels Gelled by Acid or Base | | | | |
|---|---|---|---|---|---|---|
| Gel former | Concentration [wt. %][1] | Complexing Agent | Concentration [wt. %] | Auxiliary Agent | Concentration [wt. %][1] | Cross-linking Agent |
| Water glass | 2 to 36 | suspended or emulsified, optionally dissolved in a solvent, e.g. mineral oil or kerosene, or coupled onto a hydrophobic carrier material | 1–30 preferably 10–25 | Density increasing material, e.g. BaSO$_4$ or TiO$_2$ | 0–10 | approx. 1 Normal HCl |
| Sodium aluminate | 2 to 40 | | | Density decreasing material, e.g. foamed glass | 0–10 | |
| Sodium salts of ionotropic organic gel formers | 0.5–6 | | | Solvent | 0–40 | |
| | | | | Emulsifier | 0–3 | |
| | | | | Carrier Materials | 0–25 | |
| amino sugar containing polysaccharide e.g. chitosan | 0.5–4 | | | | | approx. 1 Normal NaOH |

[1]based on the total weight of the particles containing 40 to 90 wt. % water.

II.3. Gelation by Cross-linking With a Salt

Preferred ionotropic gel formers, which are cross-linked by salts with suitable cations or anions for cross-linking, include the soluble compounds, particularly the sodium salts of polysaccharides, which may be substituted, for example, with the carboxyl group, sulfonyl group or phosphonyl group, such as alginate, pectate, carboxymethylcellulose, phosphoguar gum, carrageenan, cellulose sulfate; or amino sugar containing polysaccharides such as chitosan.

In the first step, the complexing agent dispersion containing a cross-linkable gel precursor is produced. The preferred procedure is to add the gel former to preferably deionized water and dissolve it, and optionally to add modifying agents. When chitosan is used, the dissolution may be aided in a known manner by addition of acid, for example acetic acid. The complexing agent is subsequently dispersed in this aqueous solution in the aforedescribed manner. Insofar as mixtures of gel formers are utilized, combinations of chitosan with the other gel formers described above are, however, excluded. Particles are formed by dripping or injecting, for example through a nozzle, into a liquid containing the cross-linking agent. Insofar as the gel former chitosan is present, dripping is effected into an aqueous solution which contains alkali polyphosphate, potassium hexacyanoferrate (II) or (III), or sodium hexacyanoferrate (II) or (III). Insofar as the other gel formers mentioned above (except for chitosan) are present, the gelable liquid is preferably dripped or sprayed into an aqueous solution containing a salt of multi-valent cations, especially alkaline earth salts, particularly preferably Ca salts, e.g. CaCl$_2$. The beads or strands formed in the cross-linking bath may be stirred in the cross-linking bath with the aid of a suspended stirrer for an additional 30 minutes to complete the cross-linking. Then the particles are separated from the cross-linking bath and washed with water. They may thereafter be conveyed to be used, or they may be provided with an ion-permeable shell in a further treatment step.

II.4. Gelation by Mixing Two Gelable Liquids

In a further embodiment for producing the material according to the invention, two liquids each containing a gelable gel precursor, which form a gel when mixed with each other, are combined and added to a form oil, whereby discrete particles are obtained. Preferably one of the liquids is a water glass solution, and the other is a sodium aluminate solution. In a first step, a water glass solution and an aluminate solution are produced, for example as described in DE-OS 29 17 313, and a complexing agent is dispersed in the aforedescribed manner, optionally with the addition of further modifying agents, in one or both of the solutions. The two solutions are then intensively mixed with each other, and immediately after the start of the mixing operation, i.e. within a few seconds, dripped or injected into a form oil. The term "form oil" refers to all liquids which are immiscible with water, particularly mineral oils. The resulting beads or strands are screened out and washed with water. They may be used as such, or they may, if desired, be provided with an ion-permeable shell in a subsequent treatment step.

formed by a hydrophilic, covalently or non-covalently cross-linked, organic gel. The combination of different particle materials and shell materials is generally not critical.

TABLE II.3

Materials Containing Gels Cross-linked by Salts or Other Gel Formers

| Gel Former | Concentration [wt. %][1] | Cross-linking Agent | Complexing Agent | Concentration [wt. %][1] | Auxiliary Agent [wt. %][1] |
|---|---|---|---|---|---|
| Sodium salts of organic ionotropic gel formers | 0.5–6 preferably 3–4 | $CaCl_2$, $BaCl_2$, $MgCl_2$ (each 0.5 to 4%, pref. 2% soln. in water) | Suspended or emulsified, optionally dissolved in a solvent, e.g. mineral oil or kerosene, or coupled onto a hydrophobic carrier material | 1–30 preferably 10–25 | Density increasing material (e.g. $BaSO_4$, $TiO_2$) (0–10) <br><br> Density decreasing material (e.g. foamed glass) (0–10) |
| Chitosan | 0.5–4 preferably 1–1.5 | Sodium tripolyphosphate (2 wt. % in water) K or Na hexacyanoferrate (II), (III) (4 wt. % in water) | Viscosity | | Emulsifier (0–3) <br><br> increasing material (0–5) |
| Water glass | 10–30 | Sodium aluminate (8–15 wt. % in water) | | | Carrier material (0–25) |
| Sodium aluminate | 8–15 | Water glass (10–30 wt. % in water) | | | Solvent (0–40) |

[1]based on the total weight of the particles containing 40–90 wt. % water.

III Production of a Material According to the Invention Which Contains a Hydrophilic, Covalently Crossed-linked Organic Gel Generally in the first step, the complexing agent as well as optional modifying agents and a prepolymer of the respective gel are mixed with water. Suitable prepolymers include, for example, acrylic acid, acrylonitrile, acrylamide, polyol/diisocyanate mixtures, polyurethane prepolymers, etc. The polymerization reaction is initiated in a known manner by addition of cross-linking agents, chain starters, heating, addition of hardeners or curing agents, etc.

For example, in the first step the complexing agent in an amount of up to 40 weight % may be mixed with a polyurethane prepolymer, for example, Hypol FHP 2000 from the Grace Co., Lexington and with the (optionally deionized) water, whereby density modifying agents such as up to 5 weight % heavy spar, are optionally worked into the mixture. After 10 to 20 minutes, the completed mixture is dripped or sprayed into a hardening or curing solution, for example an aqueous 0.1% polyaminoamide curing solution (XE 430 from Shering Co.). The drops, rods or strands produced thereby are removed from the curing solution after about 30 minutes and hardened or cured. After about 10 to 20 hours, the cured, discrete particles can be utilized or conveyed to a subsequent treatment step.

IV. Coating Particles According to the Invention with a Substantially Water-insoluble, Ion-permeable Shell.

The materials of the invention described above can be utilized after their production to separate ions from aqueous solutions. Preferably, however, after their production, they are encapsulated with a substantially water-insoluble, ion-permeable shell. This shell, which preferably is free of complex former, results in additional stability of the discrete particles and reduces the danger of leaching.

A material in particulate form produced in any desired manner may be encased with a shell which is formed by a hydrophilic, covalently or non-covalently cross-linked, organic gel. The combination of different particle materials and shell materials is generally not critical.

Embodiment (A) Hydrophilic, Non-covalently, Cross-linked Organic Shell Materials Discrete particles which are encapsulated with a hydrophilic, cross-linked shell material are generally produced by immersing the discrete particles in a liquid containing the cross-linkable gel precursor of the shell material and cross-linking the cross-linkable precursor which has been thusly applied to the particles in a known manner, for example by changing the temperature or contacting with a cross-linking agent.

A (a) Cross-linking by changing the temperature

Preferred gel precursors (gelatin, agar, agarose, curdlan), their concentrations and the procedure during cross-linking are analogous to the methods described in Section II.1.

A (b) Cross-linking by a cross-linking agent

The discrete particles are immersed in a liquid containing the cross-linkable precursor and subsequently introduced into a cross-linking bath. The reverse sequence of operations is likewise possible.

The introduction of the particles coated with the cross-linkable gel precursor of the shell material into a cross-linking bath may be omitted if a cross-linking agent is already contained in the particles and this cross-linking agent can migrate by diffusion into the shell material and bring about the cross-linking.

Discrete particles, the gel of which was produced by cross-linking ionotropic gel formers, for example, alginate, pectate, carboxymethylcellulose, phosphoguar gum, carrageenan and cellulose sulfate, with calcium chloride are immersed, optionally after cleaning of the surface by washing with deionized water, methanol, ethanol, etc., in an aqueous solution which contains one or more of the gel formers described above in a total concentration of about 0.1 to 3 weight %, preferably 0.2 to 0.8 weight %. Calcium ions, which are contained in the gel of the particle material, diffuse into the solution of the gel former and bring about the formation of a shell free of complex formers around the discrete particle.

In a comparable way, shells of gel precursors cross-linkable by acid can be applied without an additional cross-linking bath to discrete particles which contain appropriate acid components.

Embodiment (B) Hydrophilic, Covalently Cross-linked Organic Shell Materials

The particulate material is hereby immersed in a prepolymer, and the cross-linking of the prepolymer is initiated in a known manner in order to produce the shell. For example, the discrete particles are immersed in a water-containing polyurethane prepolymer of the previously described type, for example Hypol FHP 2000, screened out and immersed in a 0.1% polyaminoamide curing solution. After curing, a discrete particle encased with a hydrophilic, covalently cross-linked gel is present.

Preferred combinations of cross-linkable precursors and cross-linking agents as well as corresponding concentration ranges are compiled in the following Table IV.

the surrounding shells can be produced in a one-stage process.

V (a) Production by encapsulating a dispersion containing one of the gel precursors of the core material with a second liquid containing one of the gel precursors for the shell material and subsequently cross-linking by introduction into a third liquid.

The aqueous dispersion containing the cross-linkable precursor of the gel and the dispersed complexing agent is hereby encased with a liquid containing a gel precursor of the shell material prior to gelation or polymerization of the gel precursor. Intermixing of the two liquids can be avoided by adjusting to differing viscosities.

In one preferred embodiment, the gel precursors of the core material and the gel precursors of the shell material are cross-linkable in the same manner. This embodiment is suitable for using hydrophilic, noncovalently cross-linkable, organic gel precursors, particularly ionotropic gel formers, as the core material and as the shell material. By use of a suitable apparatus, for example a nozzle arrangement with a central outlet opening for the dispersion containing the gel precursor of the core material and a concentrically arranged, surrounding outlet opening for the liquid containing the gel precursor for the shell material, for example, a struc-

TABLE IV

Precursors and Cross-linking Agents for the Shell Material

| Cross-linkable Precursors | Concentration [wt. %][1] | Cross-linking Agents | Concentration [wt. %][1] | |
|---|---|---|---|---|
| Agar, agarose | 0.5–4 | — | — | Procedure |
| gelatine | 10–30 | (Cross-linking by changing the temperature) | | A (a) |
| Cationic cross-linked organic ionotropic gel formers (alginate etc.) in water | 0.1–3 | $CaCl_2$ in water | 0.5–5 preferably 2 | Procedure A (b) |
| | | $CaCl_2$ (from the core material through diffusion into the gel former solution) | — | |
| Anionic cross-linked organic ionotropic gel formers (chitosan) in water | 0.5–5 | Sodium tripolyphosphate potassium or sodium hexacyanoferrate (II), (III) | 0.2–4 | |
| | | Cationic cross-linkable organic ionotropic gels (alginate etc.) | 0.1–2 | |
| Prepolymers, e.g. PU-prepolymer Hypol FHP 2000 | ca. 80 | Water | ca. 20 | Procedure B |

[1]based on the total weight of the particles containing 40–90 wt. % water.

V. One-Stage Process for Producing a Gel-containing Material According to the Invention Provided with an Ion-permeable Shell.

In the following, process embodiments are described in which the gel-containing particles (core material) and ture comprising a core dispersion surrounded by the shell liquid can be introduced into a cross-linking bath. The cross-linking takes place in a known manner.

Concentration information for especially preferred embodiments using ionotropic gel formers are given in Table Va. The concentration of complexing agent and auxiliary agent is analogous to Table II.3/4.

TABLE V

One-stage Process for Producing Encapsulated, Gel-containing Particles

| Precursor Core Material | Concentration [wt. %][1] | Precursor Shell Material | Concentration [wt. %][1] | Cross-linking Agent |
|---|---|---|---|---|
| Cationic cross-linkable organic ionotropic gel former (alginate, pectate, etc.) in water | 1–2 | Same as core material | 3–5 | $CaCl_2$ (2 wt. %) in water |
| Anionic cross-linkable organic ionotropic gel former (chitin, chitosan) | 0.5–1 | Same as core material | 1.5–3 | Tripolyphosphate, potassium or sodium hexacyanoferrate (II), (III), 2 wt. % in $H_2O$ |

[1]based on the total weight of the particles containing 40–90 wt. % water.

V (b) One-stage process for producing encapsulated, gel-containing particles with a thermally cross-linked core and ionotropically cross-linked shells by introducing a dispersion containing a thermally cross-linkable gel precursor and a cross-linking agent into a liquid containing an ionotropically cross-linkable gel precursor of the shell material.

To a dispersion of a complexing agent in water are added a thermally cross-linkable gel precursor, preferably thermally cross-linkable by cold, for example a thermally cross-linkable polypeptide, e.g. gelatin (10 to 30 weight %) or preferably a thermally cross-linkable polysaccharide, e.g. agar or agarose (about 0.5 to about 4 weight %); an optional particle characteristic modifying agent, for example a viscosity increasing agent such as carboxymethylcellulose; and a cross-linking agent, particularly a cross-linking agent suitable for cross-linking amino sugar containing polysaccharides such as chitosan, for example an alkali tripolyphosphate or alkali hexacyanoferrate (II) or (III) at a concentration of about 0.2 to about 4 weight %. The solution which is obtained is heated to about 40° to 80° C. and dripped or sprayed into a cold aqueous solution of an ionotropically cross-linkable gel precursor, in particular into an approximately 0.1 to approximately 5 weight % aqueous solution of an amino sugar containing polysaccharide, for example chitosan. Due to the thermal cross-linking of the core material as a result of the cooling and the ionic cross-linking of the shell, discrete particles are obtained. The particles are separated and optionally washed with water.

They may be used directly as such or may be subjected to a subsequent treatment, for example to strengthen the shell.

between about 0.1 and 50 weight %. The conversion of the non-covalent cross-linking into covalent cross-linking is completed after about 15 to 180 minutes at room temperature. The degree of cross-linking can be influenced by varying the amount of cross-linking agent.

Depending on the type of complexing agent used, the material of the invention may be utilized to selectively remove a large number of metal cations from aqueous solutions.

Complexable cations of principal group metals, for example lead or tin, and further all cations of the secondary group metals, for example cations of vanadium, chromium, manganese, iron, cobalt, nickel, mercury, cadmium and copper, as well as the noble metals silver and gold and the metals of the platinum group, for example palladium, platinum, can be separated or removed by the materials of the invention.

Due to the selectivity of the material according to the invention, it is possible to achieve targeted separation of specific cations from mixtures of materials by using appropriately selective complexing agents.

The material according to the invention may be utilized in order to remove undesired metal ions, which are harmful to the health or which have corrosive effects, from aqueous solutions.

The material according to the invention can also be utilized in order to isolate or recover the content of valuable metals from aqueous solutions. Thus, for example, the metal ion content of the discharge streams of catalytically treated waste water, or of galvanic baths, or from noble metal leaching or extraction processes can be separated and conveyed to be reused.

Processes for separating cations from aqueous solutions using the material according to the invention may

TABLE V

One-Stage Process for Producing the Encapsulated, Gel-Containing Material With a Thermally Cross-linked Core and an Ionotropically Cross-linked Shell

| Precursor Core Material | Concentration [wt. %][1] | Precursor Shell Material | Concentration [wt. %][1] |
| --- | --- | --- | --- |
| Gelatine or | 10–30 | Chitosan[2] | 0.1–5 |
| Agar or | 0.5–4 | | |
| Agarose | 0.5–4 | | |
| Viscosity increasing material (carboxy-methylcellulose) | 0.5–5 | | |
| Sodium tripolyphosphate or potassium hexacyano-ferrate | 0.2–4 | | |
| Chelating agent | 1–30 | | |
| Emulsifier | 0—3 | | |
| Solvent | 0–25 | | |
| Carrier Material | 0–25 | | |

[1] based on the total weight of the particles containing 40–90 wt. % water.
[2] 1% acetic acid ad 100%

VI. Process for Strengthening a Non-covalently Cross-linked Shell Material by Conversion Into a Covalently Cross-linked Shell Material A previously provided shell of an amino group containing, non-covalently cross-linked gel, which was obtained, for example, by cross-linking amino sugar containing polysaccharides, e.g. chitosan, with anionic cross-linking agents, e.g. sodium polyphosphate or potassium hexacyanoferrate (II) or (III), is hereby brought into contact with a further cross-linking agent, which has two or more functional groups suitable for cross-linking amino groups, e.g. aldehyde groups or isocyanate groups, for example by immersion. A very suitable cross-linking agent is glutaraldehyde in aqueous solution. The concentration of this solution may amount to be carried out batch-wise, e.g. in stirred kettle reactors, or continuously, e.g. in flow reactors.

After having been used to separate metal cations, the material laden with complexed metal cations can be conveyed, for example, to a depository.

Preferably the material laden with complexed metal cations is regenerated. It is advantageous if after regeneration, the particulate material substantially free of metal cations can be used anew to separate or remove metal cations.

Not only the complexing agents themselves, but also the way to regenerate them from metal complexes are known to persons skilled in the art. The material according to the invention containing the dispersed complexing agent laden with metal cations can also be regenerated in the same, generally known manner.

For example, with regard to acid agents laden with complexed metal ions, e.g. hydroxyquinolines or hydroxyoximes, it is known that they can be regenerated by treatment with aqueous solutions having low pH-values, for example with 0.1 to 4 Normal acids. In a corresponding manner a material according to the invention laden with complexed metal cations, which contains dispersed hydroxyquinoline or hydroxyoxime as a complexing agent, can likewise be regenerated by an aqueous solution with a low pH-value.

If desired, the separated metal cations, particularly of valuable metals such as noble metals, can be isolated from the acid solution and worked-up in a known manner.

The following examples will explain the invention in further detail without limiting it in its scope.

EXAMPLE 1

Production of Ionotropically Cross-linked Gel Particles Containing Complexing Agent Suspended in the Aqueous Phase As the complexing agent in this example N,N-di-n-butyl-N'-benzoylthiourea as well as 7-(1-methyl-4-ethyloctyl)-8-hydroxyquinoline (Kelex 100 ®, from Schering AG), or O,O-dialkyldithiophosphoric acid ester (HOE F 3541 ®, from Hoechst AG) coupled onto a hydrophobic carrier material (Aerosil 805 ®, from Degussa, a silica-aerogel rendered hydrophobic by means of octylsilyl groups) were used.

1.1. Alginate-gel Particles Containing 7-(1-methyl-4-ethyloctyl)-8-hydroxyquinoline (Kelex 100 ®) Coupled to a Support Material 1.1.a. Coupling of Kelex 100 ® to the Carrier Material In order to couple it to the carrier material, 60 g of Kelex 100 ® was dissolved in 350 ml of acetone and stirred in a round flask with 60 g Aerosil R 805 ®. The solvent was removed under vacuum, and the resulting solid product was finely pulverized (yield: 119.6 g).

1.1.b. Production of Alginate Particles 12 g sodium alginate (Protanal LF 20/60 ®) were dissolved in 300 g deionized water and diluted with 185 g water. The product obtained under 1.1.a. was suspended in the completed solution by using a turbo stirrer (Ultra-Turrax). The resulting suspension was dripped into a 2% calcium chloride solution. Gel beads formed immediately. The gel beads were gently stirred for an additional 25 minutes in the cross-linking bath with a suspended stirrer and then screened out. The resulting gel beads were stored in a 0.1% $CaCl_2$ solution.

1.2. Chitosan-gel Particles Containing Kelex 100 ® Coupled Onto a Carrier Material First, 60 g Kelex 100 ® was coupled onto 60 g Aerosil R 805 ® as described under 1.1.a.

4.5 g chitosan (high-viscosity chitosan, from Protan Biopolymers) were dissolved in 300 ml of an approximately 1% aqueous acetic acid solution and diluted with approximately 185 ml water. The finely powdered product obtained according to 1.1.a. was suspended in the completed solution using a turbo stirrer (Ultra-Turrax). The resulting suspension was dripped into a 2% sodium tripolyphosphate solution. The beads which were obtained were screened out after approximately 20 minutes under light stirring with a suspended stirrer and were then ready for use.

1.3. Alginate-gel Particles Containing N,N-di-i-butyl-N'-benzoylthiourea

Approximately 100 g N,N-di-n-butyl-N'-benzoylthiourea were suspended in a solution which was obtained by dissolving about 12 g sodium alginate (Protanal LF 20/60 ®) in approximately 300 g deionized water and subsequently diluted with approximately 185 g water. The completed suspension was dripped into a 2% calcium chloride solution. The gel beads were screened out after approximately 20 minutes under light stirring with a suspended stirrer and were ready for use.

In an analogous manner, gel beads were produced with the following complexing agents and optional modifying materials:

TABLE for Example 1

| | Complexing Agent | Auxiliary Agent | Gel Formers |
|---|---|---|---|
| 1.4. | 7-(1-methyl-4-ethyloctyl)-8-hydroxyquinoline (Kelex 100,) on Aerosil 805, | $BaSO_4$ (2.5 wt. %) | Sodium alginate cross-linking material: 2% $CaCl_2$ solution |
| 1.5. | N,N-di-n-butyl-N'-benzolythiourea, suspended without carrier material | — | Chitosan (cross-linking agent: sodium tripolyphosphate 2 wt. % in water) |
| 1.6. | O,O-dialkyldithiophosphoric acid ester (Hoechst HOE 3541,) on Aerosil 805, | — | Sodium alginate cross-linking material: 2% $CaCl_2$ solution |

EXAMPLE 2

Production of Covalently Cross-linked Gel Particles Containing the Complexing Agent Suspended in the Aqueous Phase 10 g of the solid material obtained analogously to Example 1.1.a. were intimately mixed with 5 g deionized water and 20 g polyurethane prepolymer (Hypol FHP 2000, from Grace Co.). After approximately 15 minutes, the mass was squirted or sprayed into a 0.1% polyaminoamide curing solution (XE 430, from Schering). Depending on the speed of the spray, spherical or strand-formed discrete particles were obtained. These polyurethane particles were allowed to remain 30 minutes in the curing solution, screened out and cured for 15 more hours. Thereafter they could be utilized directly. Strand-formed particles were cut to the desired length (preferably 5 to 10 mm).

EXAMPLE 3

Production of Particles Containing an Ionotropically Cross-linked Gel Containing Emulsified Complexing Agent 3.1. Production of Alginate-gel Particles Containing an Emulsion of 2-hydroxy-5-t-nonylacetophenone Oxime (SME 529 ®)

20 g 2-hydroxy-5-t-nonylacetophenone oxime (Shell Oil SME 529 ®) were processed with 80 g of the alginate solution described in Example 1.1b. (Protanal LF 20/60 ®) as well as with an emulsifier (HLB-value > 10; Emulsogen L ®, from Hoechst AG was used) using a turbo stirrer (Ultra-Turrax) to produce a stable emulsion. About 1 to 2 weight % emulsifier, based on the amount of the complexing agent, was required for this purpose. The particle size of the emulsified oil droplets was approximately 25 µm. The resulting emulsion was dripped into a 2% $CaCl_2$ solution, whereupon gel beads were immediately obtained. The beads were stirred an additional 30 minutes in the cross-linking liquid with a suspended stirrer, screened out and stored in a 0.1% $CaCl_2$ solution. They may either be used for their intended purpose or alternatively may be provided with an ion-permeable shell in a further treatment stage.

In an analogous manner the particulate materials listed in Table 3 under entries 3.2. through 3.7. were produced which contained the indicated complexing agents, from 1 to 2 weight % emulsifier in each case, and the indicated auxiliary agents or solvents. The information in parentheses represent the percentage by weight based on the completed material.

TABLE for Example 3

| Complexing Agent | Auxiliary Agent or Solvent |
| --- | --- |
| 3.2 2-hydroxy-5-t-nonylacetophenone oxime (Shell SME 529 ®) (27) | $TiO_2$ (7) |
| 3.3 N,N-dibutyl-N'-benzoylthiourea (5) | Kerosene (25) |
| 3.4 7-(1-methyl-4-ethyloctyl)-8-hydroxyquinoline (Kelex 100 ®, Schering) (25) | $TiO_2$ (10) |
| 3.5 7-(1-methyl-4-ethyloctyl)-8-hydroxyquinoline (Kelex 100 ®, Schering) (15) | Kerosene (15) |
| 3.6 O,O-dialkyldithiophosphoric acid ester (HOE F 3541 ®) (10) | Kerosene (21) |
| 3.7 Diisotridecylamine (HOE F 2552 ®, Hoechst AG) (25) | Kerosene (5) |

EXAMPLE 4

Production of Particles in Which the Continuous Aqueous Phase Containing Suspended or Emulsified Complexing Agent is Encapsulated by a Water-insoluble, Ion-permeable Shell 4.1. Production of Particles Containing a Suspension of 7-(1-methyl-4-ethyloxyl)-8-hydroxyquinoline (Kelex 100 ®) Coupled to a Carrier Material 4.1.a. Production of the Aqueous Phase An alginate solution was produced by dissolving 12 g sodium alginate as a cross-linking agent in 300 g deionized water and diluting with 185 g water as described in Example 1.1.b.

4.1.b. Production of a Solution Containing a Cross-linkable Precursor of a Gel 4.5 g chitosan were dissolved in 300 ml of an approximately 1% acetic acid solution and diluted with 185 ml water as described in Example 1.1.c.

4.1.c. As described in Example 1.1.a., Kelex 100 ® was coupled onto Aerosil R 805 ® in a weight ratio of 1:1. 20 g of the product which thereby resulted was suspended in 80 g of the alginate solution produced under Example 4.1.a.

The resulting suspension was dripped into the chitosan solution produced in Example 4.1.b. Spheres with a cross-linked gel shell immediately formed. The resulting spherical particles were screened out after about 30 minutes and conveyed to their intended use or to a further processing step.

4.2. Production of Particles Containing an Emulsion of 2-hydroxy-5-t-nonylacetophenone Oxime (SME 529 ®)

In 180 g of the alginate solution obtained in Example 4.1.a., an emulsion of 20 g SME 529 ® was produced using an emulsifier as described in Example 3. This emulsion as then further processed as described in Example 4.1.c. Spherical particles were obtained which were conveyed to their intended use or to a further processing step.

EXAMPLE 5

Coating of the Discrete Particles with a Substantially Water-Insoluble, Ion-permeable Shell $CaCl_2$ was utilized as the cross-linking agent. In order to impregnate with the cross-linking agent, approximately 150 g of the beads obtained according to Example 1, 3 or 4 were introduced into a 2% $CaCl_2$ solution, permitted to remain therein for approximately 2 hours, screened out, washed briefly with deionized water which contained 50 weight % ethanol, and surface dried for approximately 15 minutes in the air.

Then they were screened into 100 ml of a solution of sodium alginate in deionized water. This solution was produced by dissolving 30 g sodium alginate in 1000 g deionized water and diluting the resulting solution to a 0.75 weight % alginate containing solution by addition of further deionized water. The beads remained approximately 15 minutes in the alginate solution under light stirring with a suspended stirrer. During this time, calcium ions diffused out of the interior of the beads to the surface and brought about the cross-linking of the alginate with formation of a water-insoluble, ion-permeable gel shell.

In order to be worked up, the solution was diluted with 1000 ml deionized water. The beads were subsequently screened out, washed with deionized water, immersed for 20 to 30 minutes in a stirred 2% CaCl solution in order to effect post-cross-linking and were then ready for further processing.

EXAMPLE 6

One-stage Production of Gel Beads with Water-insoluble, Ion-permeable Shells

A solution A and a solution B were produced separately from each other.

Solution A was an emulsion which contained 1.5 weight % sodium alginate (Protanal LF 20/60) in 88.5 weight % deionized water as well as approximately 10 weight % 2-hydroxy-5-t-nonylacetophenone oxime (SME 529 ®, from Shell).

Solution B was a solution containing 3.3 weight % of sodium alginate in deionized water.

Solution A was conducted to the central opening of a two-component nozzle; around this central opening a further opening was concentrically arranged. The solution B was conducted to the further opening. The flow rate of solution A relative to solution B was set to a ratio of about 2:3. Droplets were produced which were dripped into a stirred, approximately 2% $CaCl_2$ solution. In order to complete the cross-linking, the resulting spheres were maintained for approximately 45 minutes in the cross-linking solution stirred by a suspended stirrer and then screened out, washed with deionized water and dried. The resulting beads could be utilized immediately for their intended purpose.

EXAMPLE 7

One-stage Production of Encapsulated Material Containing a Thermally Cross-linked Gel as a Core Material and an Initially Ionotropically Cross-linked Shell Which is Converted Into a Covalently Cross-linked Shell in Order to Strengthen It

7.1. Particles Containing Emulsified Complexing Agent

7.1.a. Production of the Emulsion 200 ml of a 2 weight % aqueous agar solution were heated to approximately 60° C. and maintained at that temperature until complete cross-linking. Next approximately 4 g sodium tripolyphosphate were added to this solution. Subsequently, carboxymethylcellulose were added in order to increase the viscosity of the solution. The amount of this viscosity-increasing material was regulated in such a way that during the subsequent cross-linking in the cross-linking agent bath, the finished emulsion which was dripped in was not dispersed, but remained instead in droplet form. For this purpose approximately 3 g carboxymethylcellulose were required. The solution was then adjusted to a pH-value of about 5 with phosphoric acid and emulsified with about 20 g of the liquid complexing agent 7-(1-methyl-4-ethyloctyl)-8-hydroxyquinoline (Kelex 100 ® from Schering AG) by means of a turbo stirrer (Ultra-Turrax), whereby the emulsion was stabilized using 0.5 g of an emulsifier (Emulsogen L ®, from Hoechst AG). The complete emulsion was maintained at about 60° C. until further processing.

7.1.b. Production of the Cross-linking Agent Bath 10 g chitosan were dissolved in 1000 ml of a 1 weight % aqueous glacial acetic acid solution (pH-value: about 4). For this purpose a high-viscosity chitosan from the firm Chungai Boyeki of Duesseldorf, Germany, was utilized. The resulting 1-weight % chitosan solution was subsequently diluted with water to a chitosan content of 0.3 weight %. The cross-linking agent bath comprised 2000 ml of this 0.3 weight % chitosan solution and was maintained at 15° C.

7.1.c. Production of the Particles

The emulsion of the complexing agent which had been maintained at 60° C. was then dripped into the cross-linking agent bath which had been maintained at 15° C. The beads which thereby formed remained approximately 15 minutes in the solution, and were then screened out and stored 5 hours in a buffer solution (0.1 N $Na_2HPO_4$ in water, pH-value: approximately 8).

Subsequently the beads were screened out again and immersed in a second cross-linking agent bath in order to strengthen the shells. This second cross-linking agent bath was a solution obtained by mixing about 15 g glutaraldehyde with 500 ml water adjusted to a pH-value of about 7 with caustic alkali. After 30 minutes in this second cross-linking agent bath, the beads were screened out, washed and were ready to use.

7.2. Particles Containing Suspended Complexing Agent

Approximately 30 g of a solid material which was produced in accordance with Example 1.1.a. and which contained 2-hydroxy-5-t-nonylacetophenone oxime (SME 529 ®, from Shell AG) as a complexing agent coupled onto a hydrophobic silica-aerogel (Aerosil R 805 from Degussa AG), was finely pulverized prior to suspension and then suspended in an aqueous agar solution produced analogous to Example 7.1.a., and the resulting suspension was introduced into a cross-linking agent bath obtained according to Example 7.1.b. and further processed as described in Example 7.1.c.

EXAMPLE 8

Use of the Material Produced in Accordance with the Invention to Separate $Cu^{2+}$ and $Ni^{2+}$ Ions (A) Approximately 10 g of the alginate beads produced in Example 3.1. as well as approximately 0.1 g $CaCl_2$ were added to 100 ml of a solution which contained 67.2 mg/l $Cu^{2+}$ ions and 65.9 mg/l $Ni^{2+}$ ions. Stirring was carried out intensively for 30 minutes with a magnetically driven stirrer at room temperature. During the stirring, the pH-value decreased from 4.8 to 2.7. The beads were screened out and the residual concentrations of $Cu^{2+}$ and $Ni^{2+}$ in the solution were determined by atomic absorption spectroscopy. For $Cu^{2+}$ a residual concentration of 15% was determined, and for $Ni^{2+}$ a residual concentration of 85% of the original value was determined.

The beads laden with heavy metal ions were regenerated with 50 ml of 1 Normal hydrochloric acid which contained 0.1 weight % $CaCl_2$. The absorbed $Ni^{2+}$ could be completely recovered after 30 minutes, the absorbed $Cu^{2+}$ after 60 minutes, while the regenerated beads could be reutilized anew.

(B) The experiment described under (A) was repeated. This time 20 g of the particles containing approximately 10 weight % emulsified SME 529 as a complexing agent produced in Example 7.1. were utilized. The separating results which were achieved were comparable to the results obtained in (A).

The foregoing description and examples have been set forth merely to illustrate the invention and are not intended to be limiting. Since modifications of the described embodiments incorporating the spirit and substance of the invention may occur to persons skilled in the art, the scope of the invention should be limited solely with respect to the appended claims and equivalents.

We claim:

1. A particulate material suitable for selective separation of metal cations from aqueous solutions, wherein said material comprises a non-ionic, non-polymeric complexing agent, which is capable of complexing with the metal cations and which is dispersed in a continuous aqueous phase, and wherein said continuous aqueous phase is embedded in substantially localized, bound form in a hydrophilic gel, or said continuous aqueous phase is a freely movable component within a hydrophilic gel, or said continuous aqueous phase is encapsulated by a water-insoluble, ion-permeable shell.

2. A particulate material according to claim 1, wherein said aqueous phase is embedded in a gel or is a component of a gel.

3. A particulate material according to claim 2, wherein said gel is a hydrophilic, cross-linked, organic gel.

4. A particulate material according to claim 2, wherein said material is encapsulated by a substantially water-insoluble, ion-permeable shell.

5. A particulate material according to claim 3, wherein said material is encapsulated by a substantially water-insoluble, ion-permeable shell.

6. A particulate material according to claim 5, wherein the continuous aqueous phase is embedded in a thermally cross-linked, hydrophilic, organic gel and is encapsulated by a covalently cross-linked, hydrophilic, organic gel.

7. A particulate material according to claim 1, wherein said complexing agent has a molecular weight of less than 1000 Daltons.

8. A particulate material according to claim 1, wherein said material consists of particles having a diameter of from about 0.1 mm to about 6 mm.

9. A particulate material according to claim 1, wherein said material comprises from about 0.5 to about 30 wt.-% gel formers, from about 1 to about 50 wt.-% complexing agent, from 0 to about 40 wt.-% water-insoluble solvent, from 0 to about 10 wt.-% conventional auxiliary agents, and from about 40 to about 90 wt.-% water.

10. A particulate material according to claim 1, wherein said material contains a complexing agent coupled onto a hydrophobic carrier material.

11. A process for separating metal cations from an aqueous solution comprising the step of contacting said solution with a particulate material comprising a non-ionic, non-polymeric complexing agent, which is capable of complexing with the metal cations and which is dispersed in a continuous aqueous phase, wherein said continuous aqueous phase is embedded in substantially localized, bound form in a hydrophilic gel, or said continuous aqueous phase is a freely movable component within a hydrophilic gel, or said continuous aqueous phase is encapsulated by a water-insoluble, ion-permeable shell.

12. A process for producing a particulate material which is suitable for selectively separating metal cations from aqueous solutions and which contains a non-ionic, non-polymeric agent capable of complexing with the metal cations and dispersed in a continuous aqueous phase, wherein said continuous aqueous phase is embedded in substantially localized, bound form in a hydrophilic gel, or said continuous aqueous phase is a freely movable component within a hydrophilic gel, or said continuous aqueous phase is surrounded by a water-insoluble, ion-permeable shell, said process comprising the steps of:

(a) dispersing said complexing agent in an aqueous phase which contains a cross-linking agent, a precursor of a hydrophilic gel cross-linkable by a cross-linking agent or a thermally cross-linkable precursor of a hydrophilic gel; and (b) forming particles from the dispersion obtained in step (a) by a step (b) selected from the group consisting of (b1) introducing a dispersion obtained in step (a) containing a cross-linking agent into a solution which contains a gel precursor of a water-insoluble, ion-permeable shell material cross-linkable by the said cross-linking agent in order to encapsulate the dispersion with a substantially water-insoluble, ion-permeable shell;

(b2) introducing a dispersion obtained in step (a) containing a thermally cross-linkable hydrophilic gel precursor into a liquid phase which has a temperature suitable to thermally cross-link the gel precursor in order to form discrete gel particles; and (b3) introducing a dispersion obtained in step (a) containing a precursor of a hydrophilic gel cross-linkable by a cross-linking agent into a solution containing said cross-linking agent or working said cross-linking agent into the dispersion.

13. A process according to claim 12, further comprising the step of:
(c) coating particles obtained in said step (b) with a substantially water-insoluble, ion-permeable shell.

14. A process according to claim 12, further comprising the step of:
(c) coating particles obtained in said step (b) with a surrounding shell of a non-covalently cross-linked amino group containing shell material, and covalently cross-linking the shell material to strengthen the shell.

15. A process according to claim 12, wherein particles obtained in step (b) have a surrounding shell of a non-covalently cross-linked shell material, further comprising the step of covalently cross-linking the shell material to strengthen the shell.

16. A process according to claim 12, wherein the dispersion obtained in step (a) contains a precursor of a hydrophilic gel which is thermally cross-linkable by heat, and the dispersion is introduced in step (b) into a liquid phase which has a sufficiently high temperature to thermally cross-link the gel precursor.

17. A process according to claim 12, wherein the dispersion obtained in step (a) contains a precursor of a hydrophilic gel which is thermally cross-linkable by cold, and the dispersion is introduced in step (b) into a liquid phase which has a sufficiently low temperature to thermally cross-link the gel precursor.

18. A process according to claim 13, wherein in step (c) the particles are contacted with a cross-linkable gel precursor of a material for forming said shell, and the cross-linkable gel precursor is then cross-linked.

19. A process according to claim 12, wherein a dispersion obtained in step (a) which contains a cross-linkable precursor of a gel, and a second liquid which contains a cross-linkable gel precursor of a water-insoluble, ion-permeable shell, are introduced together into a third liquid in such a way that the dispersion is surrounded by the second liquid.

20. A process according to claim 19, wherein the dispersion obtained in step (a) is introduced through a nozzle which is surrounded by a conduit through which the second liquid is supplied.

21. A process according to claim 13, wherein said shell is formed by introducing a dispersion obtained in step (a) which contains a thermally cross-linkable precursor of a gel to be formed in the particle and a cross-linking agent which is capable of cross-linking ionotropically cross-linkable gel precursors into an aqueous solution of an ionotropically cross-linkable gel precursor of a gel material for forming the shell, said solution having a temperature sufficient to cross-link said thermally cross-linkable precursor.

22. A process according to claim 21, wherein said thermally cross-linkable precursor contained in said dispersion is cross-linkable by heat, and said solution of said ionotropically cross-linkable gel precursor is sufficiently warm to cross-link said thermally cross-linkable precursor.

23. A process according to claim 21, wherein said thermally cross-linkable precursor contained in said dispersion is cross-linkable by cold, and said solution of said ionotropically cross-linkable gel precursor is sufficiently cool to cross-link said thermally cross-linkable precursor.

24. A process according to claim 21, wherein an anionic cross-linking agent is used as the cross-linking agent, and an amino sugar containing polysaccharide is used as the ionotropically cross-linkable gel precursor of the material for forming the shell.

25. A process according to claim 14, wherein non-covalently cross-linked shell material containing amino groups is contacted with a cross-linking agent which is capable of covalently cross-linking amino groups in order to strengthen the shell.

26. A process according to claim 12, wherein in step (a) a complexing agent which is coupled onto a solid, hydrophobic carrier material is suspended in the aqueous phase.

* * * * *